United States Patent [19]

Schmit et al.

[11] Patent Number: 4,458,475

[45] Date of Patent: Jul. 10, 1984

[54] COMPOSITE REINFORCEMENT CORD

[75] Inventors: Georges J. E. Schmit, Bridel; Thomas N. H. Welter, Keispelt, both of Luxembourg

[73] Assignee: The Goodyear Tire & Rubber Company, Akron, Ohio

[21] Appl. No.: 916,271

[22] Filed: Jun. 16, 1978

[51] Int. Cl.³ .............................................. D02G 3/02
[52] U.S. Cl. ................................... 57/243; 57/902; 428/395
[58] Field of Search .................. 152/359, 356 R, 354; 156/123, 128, 127; 57/139, 225, 902, 243; 428/395

[56] References Cited

U.S. PATENT DOCUMENTS

| | | | |
|---|---|---|---|
| 3,429,354 | 2/1969 | Brooks | 57/210 X |
| 3,756,883 | 9/1973 | Gay | 156/123 |
| 3,929,180 | 12/1975 | Kawase et al. | 152/356 X |
| 3,968,725 | 7/1976 | Holzhauer | 57/210 X |

Primary Examiner—John J. Love
Attorney, Agent, or Firm—Frederick J. Lacher; Frank Pincelli

[57] ABSTRACT

A composite cord for reinforcing a tire or other elastomeric article having at least one high strength, substantially inextensible yarn spirally wrapped around a core. The core at room temperature has sufficient strength and elasticity to resist and recover from tension forces on the core required during the processing of the cord and building of the tire. The core is composed of material which loses its tensile strength when subjected to temperatures of vulcanization to permit stretching out of the yarn to allow for substantial elongation of a part or all of the tire and then provide reinforcement of the elongated tire by the stretched out, high strength yarn.

12 Claims, 5 Drawing Figures

COMPOSITE REINFORCEMENT CORD

BACKGROUND OF THE INVENTION

The invention is directed to a composite reinforcement tire cord similar to cords having a relatively weak core around which much stronger, inextensible yarns or cords are coiled, such that the composite cord has, initially, a low tensile modulus which abruptly changes to a substantially higher modulus upon predetermined elongation of the cord. The cores of the tire cords used heretofore are typically composed of either a low tensile material such as a single strand of cotton, rayon, nylon or polyester, which is readily breakable, or a vulcanized elastomeric material which is stretchable and allows the inextensible yarns to uncoil and straighten out during the toroidal shaping and molding of the tire.

The invention is directed to the provision of a composite, highly elongatable cord having a core which, at room temperature under tension, has a barrier to elongation and elastic recovery. Further, the core is composed of material that loses its tensile strength when subjected to high temperature during the molding and vulcanization operations so as to permit elongation of the yarns wrapped around the core.

Briefly stated, the invention is in a composite cord for reinforcing elastomeric articles such as tires. The composite cord comprises a plurality of substantially inextensible yarns which are spirally wrapped around a core which has an elastic limit, at low elongation, sufficient to maintain the configuration of the cord during processing, but which loses its tensile strength during the molding and vulcanization of the elastomeric article to permit extension of the cord after being subjected to the temperature of vulcanization.

DESCRIPTION OF THE DRAWING

The following description of the invention will be better understood by having reference to the annexed drawing, wherein.

DETAILED DESCRIPTION

Figure 1:
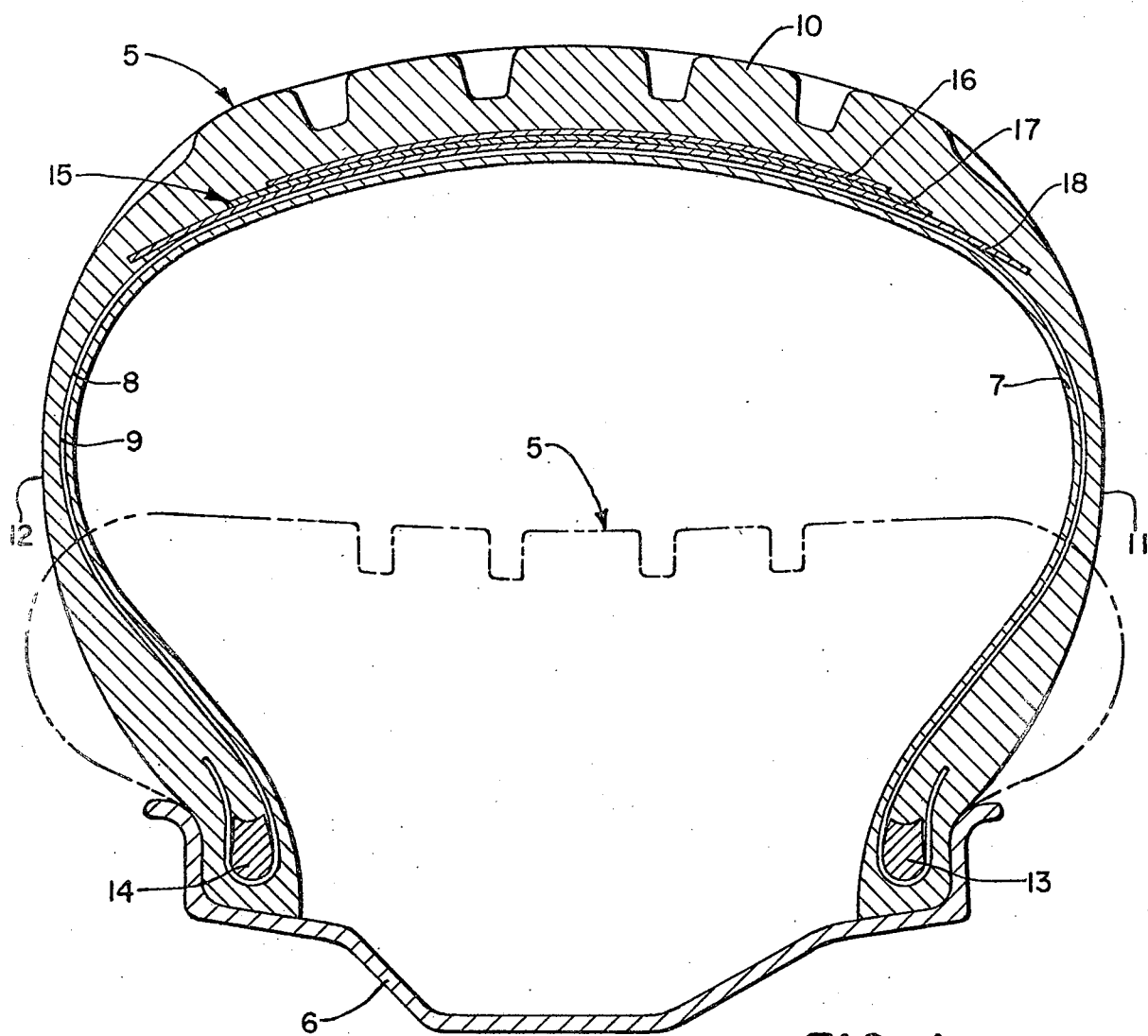
FIG. 1 is a section of an inflated tire mounted on a wheel rim, illustrating certain uses of the composite cord of the invention and the tire being shown in the deflated condition in a chain-dotted line.

Referring more particularly to FIG. 1, there is shown a tire 5 which is mounted and inflated on a wheel rim 6. The tire 5 comprises a fluid impervious innerliner 7; at least one carcass ply 8, including a layer of reinforcement cords 9, adjacent the innerliner 7; and a thread 10 and pair of sidewalls 11 and 12 which surround the carcass ply 8 and terminate at a pair of annular metal beads 13 and 14. A belt structure 15, comprising a pair of superimposed belt plies 16 and 17 is positioned between the tread 10 and carcass ply 8 to reinforce the tire 5. A carcass overlay, or belt underlay 18, is interposed between the belt structure 15 and carcass ply 8. The tire 5 is preferably of the radial type wherein the reinforcement cords 9 of the carcass ply 8 are disposed at angles of from 75 to 90 degrees measured in relation to a plane containing the mid-circumferential centerline of the tread 10, such plane hereafter referred to as the centerplane. The belt plies 16 and 17 are reinforced with cords disposed at angles in the range of from 16 to 24 degrees relative to the centerplane. The cords of the belt plies 16 and 17 cross the centerplane in opposite directions. The cord angles of the belt plies 16 and 17 are the same, but lie in opposite directions from the centerplane. The cord angles are in relation to a tire which is molded, vulcanized and uninflated. The tire 5 may also be of a radial type designed to be molded with a smaller diameter than the inflated tire, shown in a chain-dotted line adjacent the wheel rim 6.

Figure 2:
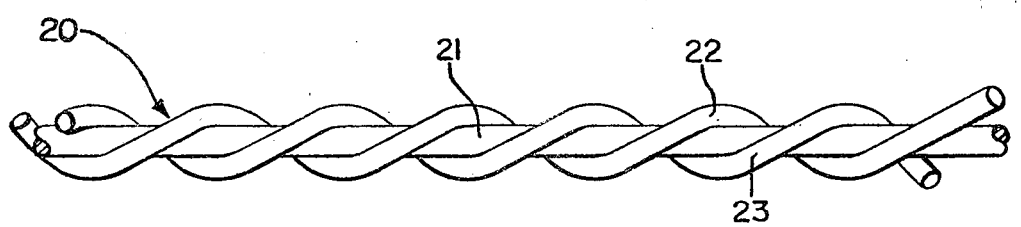
FIG. 2 is a view of a composite cord made in accordance with the invention.

Referring now to FIG. 2, there is shown a composite cord 20 which is utilized to reinforce various components of the tire 5, e.g. the carcass ply 8, the belt structure 15, or the carcass overlay 18. The composite cord 20 comprises a core 21 with a spiral or helical wrapping of one or more substantially inextensible yarns 22, 23.

The core 21 is of a low molecular weight polymeric material selected from the group comprising polyolefines including polyethylene and polypropylene. A particularly good core 21 was found to be a polymeric monofilament of polyethylene or polypropylene having a density in the range of from 0.9 to 1.0 grams per cubic centimeter (gr/cm$^3$). The core 21 at room temperature may have an elastic limit of at least 2.5 kilograms and preferably of at least 1.5 grams per denier (gr/dn), a breaking strength less than 20 kilograms, and an initial modulus of elasticity of at least 25 grams per denier in the load range of from 0 to 2.5 kilograms.

The core 21 is degradable at temperatures normally used to vulcanize rubber which are usually over 120° C. and in the broad range of from 120° C. to 150° C., and in the preferred narrower range of from 130° C. to 140° C. After the core 21 is subjected to these elevated temperatures, the modulus of elasticity is reduced to 4 grams per denier or less and remains at the reduced amount when it is cooled to lower temperatures such as the outside temperatures at which a tire is used. The tenacity of the core 21 is also reduced to zero or a negligible amount of around 1 gram per denier after the core is subjected to these temperatures. It is not entirely understood but it is believed the loss in tensile strength of the core 21 results from a partial or total loss of crystalline structure to induce molecular slips upon the application of stress.

The core 21 described above consists of one filament; however, in some applications it may be desirable to have more than one filament, for example, three. The core 21 may be coated with a rubberized compound before the yarns 22,23 are wound around the core. It may also be desirable to use a stapled polymer monofilament similar to cotton filaments which is completely coated with a rubberized compound before it is incorporated into the cord 20 to provide improved adhesion with the yarns 22,23 of the cord.

The yarns 22,23 which are spirally wrapped in the form of a helix around the core 21, may be composed of any suitable reinforcing material which is used for conventional tire reinforcement cords having a tenacity of at least 6 grams per denier. Among these materials are rayon, nylon, polyester, aramid and steel. Each of the yarns 22,23 is formed of at least one strand that is composed of filaments which are twisted around each other. Yarns 22,23, composed of one strand having a denier in the range of from 800 to 1500 and helically wrapped around the core 21 in either an S- or Z-direction at a rate of from 3 to 7 turns per centimeter, were successfully used to form a good composite cord 20 which was elongatable between 50 percent and 100 percent. The yarns 22,23 may also be composed of a plurality of strands which are cabled together, generally in a direction which is opposite that which the filaments of each strand are twisted.

EXAMPLE OF A COMPOSITE CORD

A good composite core 20 comprises a core 21 which is a monofilament that is composed of polyethylene having a density of 0.96 gr/cm$^3$ at room temperature of about 20°-22° C.

Two substantially inextensible yarns 22,23 are spirally wrapped around the center core 21 in opposed lay. The yarns 22,23 are each formed of a single, 1500 denier strand which is composed of filaments of aramid twisted together. The twist in the individual strands or yarns 22,23, in this case, is in a Z-direction at a rate of 2.5 turns per centimeter. The twist of the yarns 22,23 around the core 21 is in an S-direction at a rate of 6 ns per centimeter. Due to the mutually opposed lay of the yarns 22,23 around the core 21, the yarns 22,23 will, during elongation of the composite cord 20 after subjecting the core 21 to a temperature used for vulcanization, twist into a single twisted cord of the type conventionally used in the reinforcement of tires.

The polyethylene monofilament core 21 of this example has the following properties at room temperature:

| | |
|---|---|
| density | 0.96 gr/cm$^3$ |
| diameter | 0.50 mm |
| breakihg strength | 10 kg |
| elastic limit | 9 kg |
| Young modulus at 2.5 1 g | 75 gr/dn |
| elongation at elastic limit | 17% |
| elastic recovery at 3% elongation | 90% |
| denier | 1700 |

Figure 3:
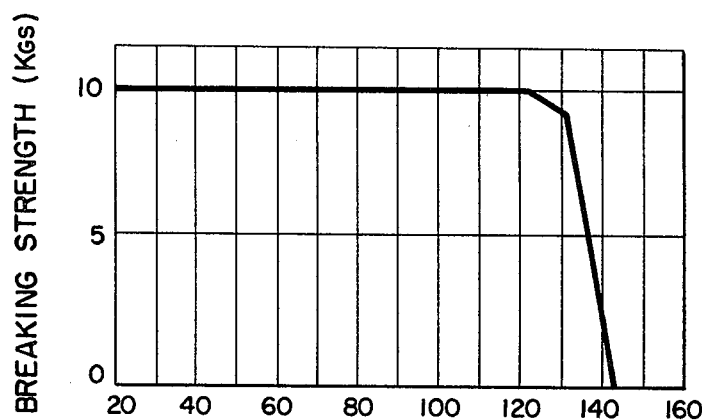
FIG. 3 is a diagram illustrating the thermoplastic behavior of the core of the composite cord of FIG. 2.

Referring to FIG. 3, the thermoplastic behavior of the polyethylene monofilament core 21 is charted as a function of the breaking strength in kilograms vs. the temperature in degrees centigrade. More specifically, FIG. 3 shows the breaking strength of the core 21, after 5 minutes of heat treatment at the respective temperatures. As can be appreciated from FIG. 3, the breaking strength of the polyethylene core 21 remains unaffected by the temperature up to about 122° C. at which temperature the breaking strength starts to decrease. By processing at higher temperatures the breaking strength of the core 21 is further reduced and at about 142° C. the breaking strength is reduced to substantially zero. Thus, it will be appreciated that the polyethylene monofilament core 21 will not lose its original tensile resistance during processing of the cord 20, if it is not subjected to temperatures above 120° C. On the other hand, it will be appreciated that the core 21, when embedded in a tire 5, will, unlike cores of prior art cords, lose its tensile resistance during vulcanization of the tire which is normally carried out at about 150° C.

Figure 4:
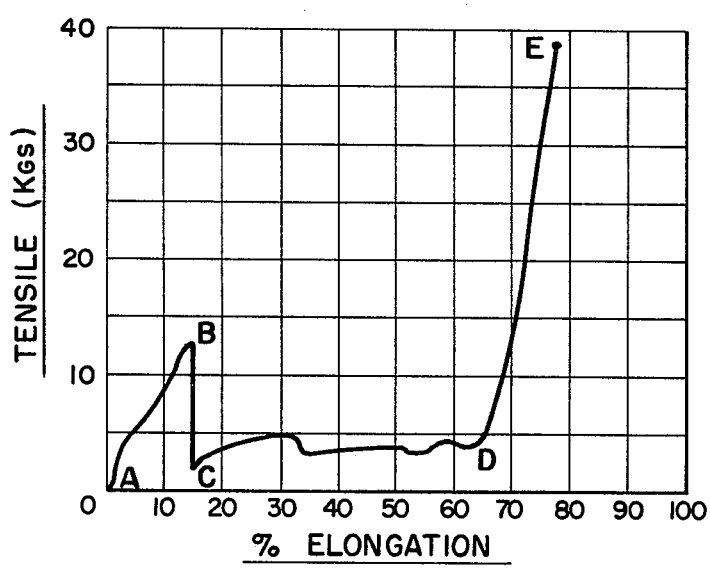
FIG. 4 is a stress-strain diagram of the composite cord of FIG. 2, prior to subjecting the cord to temperatures above 120° C.

Referring now to the stress-strain diagram of FIG. 4, the cord 20 with the polyethylene monofilament core 21 passes through three phases or stages. First, there is an intial high modulus phase A-B which the cord 20 experiences as the core 21 stretches to the point where it loses its tensile resistance. Secondly, the cord 20 passes through a low modulus phase C-D where the inextensible yarns 22,23 are stretched out and the tensile strength of the cord gradually increases. Thirdly, the cord 20 passes through the final, high modulus phase D-E where the uncoiled yarns 22,23 are twisted and tensioned until they break at point E.

It will be appreciated that the initial region A-B forms a barrier to appreciable elongation of the cord 20 for tensiles up to around 12 kilograms. Within this barrier, the cord 20 has a high modulus and high elastic recovery. Thus, in consequence of this barrier, the cord 20 has sufficient strength to resist and recover from any tensional forces imparted to the cord during its processing or the processing of tire components reinforced with such cords, before the shaping and vulcanization of a tire composed of such components.

A typical processing of the cord 20 includes mechanical and thermal stresses, the latter being experienced by the cord as it is exposed to temperatures of from 100° C. to 120° C. to dry the cord, after it has been coated with a resorcinol formaldehyde type adhesive for promoting the bond between the cord and rubbery material used in the production of tires.

Figure 5:
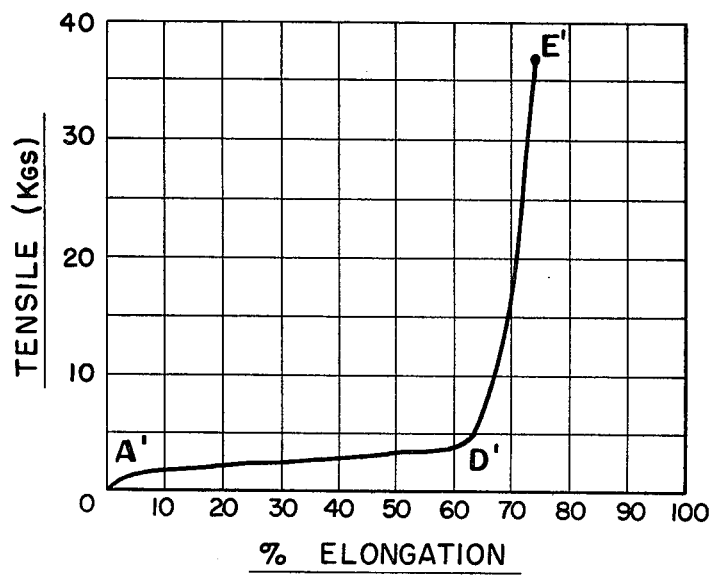
FIG. 5 is a stress-strain diagram of the composite cord of FIG. 2, after the cord has been subjected to temperatures up to 156° C.

Referring now to the stress-strain diagram of FIG. 5, the same cord 20 with the polyethylene monofilament core 21 has lost its tensile resistance after it has been subjected to 15 minutes of heat treatment at 156° C. The elongation barrier A-B of the cord 20, when unheated, as seen in FIG. 4, substantially disappears. There is only a low modulus substantially linear region A'-D' corresponding to the high elongation of the cord 20 as the yarns 22,23 stretch out, and then a high modulus phase D'-E' corresponding to the extension of the twisted yarns.

Thus, it can be appreciated that the composite tire cord 20 of the invention provides a substantial advantage over prior art composite cords in that it has an initial, elastic, high modulus elongation barrier providing sufficient resistance and recovery of the cord with respect to any processing tensions experienced by the cord before shaping and vulcanization of the tire, whereas after vulcanization the cord has no such barrier and may be elongated with a minimum of effort.

The composite cord 20 of the invention is particularly well suited for use in a radial spare tire, as described in copending U.S. application Ser. No. 916,270 now abandoned which was concurrently filed with this application. The copending application covers a radial tire having composite cords in the carcass and the belt. The tire is vulcanized in the radially reduced configuration where the composite cords are still in a helical condition. As shown in FIG. 1, a radial tire 5 may have such composite cords 20 in carcass plies 9, in belts 16,17 of belt structure 15 and in a carcass overlay 18, and can be molded and vulcanized in a shape (shown by the chain-dotted line) having a reduced diameter while the yarns 22,23 are still in a helical condition.

It should be apparent from the above description that during vulcanization, the core 21 degrades and the elongation barrier A-B of FIG. 4 disappears. Therefore, after vulcanization, the tire 5 is easily expanded to its normally inflated and running condition as the yarns 22,23 are readily elongated and twist into twisted reinforcing cords. The composite cord 20 can also be utilized in the carcass overlay 18 described in copending U.S. application Ser. No. 916,272 now U.S. Pat. No. 4,240,486 which was concurrently filed with this application. The copending application is directed to a tire in which the carcass ply 8 has conventional cords and where it is desirable to have the cords in the overlay 18 at very low cord angles relative to the centerplane of the tire 5. The composite cord 20 can also be used in the belt structure 15 where it is desirable to produce the tire 5 by the flat band method wherein the components of the tire are laid up on a cylindrical tire building drum.

Thus, it can be appreciated that all of the reinforcement cords can be of the composite type, as described, in cases where the tire is molded with a reduced diameter for use as a spare tire. Also the individual components of the tire 5, such as the belt structure 15 or carcass overlay 18, can be formed of such composite cords 20 to allow unrestricted expansion of the tire at least to the point where the substantially inextensible yarns 22,23 become twisted together and tensioned.

It will be understood that with the cords 20 of the present invention a relatively high elongation may be easily obtained. It takes relatively little effort or work to stretch out the cords 20 to their full extent, because the core 21 offers little or no resistance to the stretching out of the individual yarns 22,23 of each cord after being subjected to temperatures normally used for vulcanization.

Thus, there has been described a tire 5 that is reinforced with composite cords 20 composed of substantially inextensible yarns 22,23 which are spirally wrapped around a core 21 of polyethylene or polypropylene that loses its tensile strength during the molding and vulcanization process, thereby allowing elongation of the composite cores as the individual yarns stretch out.

It will be clear that the cord of the present invention may also be used in articles other than tires without departing from the scope of the present invention.

What is claimed is:

1. A composite cord for reinforcing an elastomeric article, comprising at least one high tenacity substantially inextensible yarn spirally wrapped around a core, said core including at least one filament having at room temperature an elastic limit of at least b 2.5 kilograms and a modulus of elasticity greater than 25 grams per denier providing a barrier to elongation to resist and recover from tension forces on the cord during the processing of said cord. and elastomeric article until said core is subjected to temperatures normally used during vulcanization of rubber and thereafter said core having a reduction in tenacity after being subjected to temperatures normally used during vulcanization of rubber to permit stretching out of said yarn when said core is cooled to allow for elongation of the elastomeric article and then reinforcing of the article in the elongated condition when said yarn is stretched out.

2. The cord of claim 1 wherein said temperatures normally used during vulcanization are in the range of 120° C. to 150° C.

3. The cord of claim 1 wherein the core is composed of a polymer of the group consisting of polyolefines.

4. The cord of claim 3 wherein said polyolefines include polyethylene and polypropylene.

5. The cord of claim 1 wherein the core is a monofilament.

6. The cord of claim 1 wherein the core has an elastic limit of at least 1.5 grams per denier before being subjected to said temperatures normally used during vulcanization.

7. The cord of claim 2 wherein the core has said reduction in tenacity at a temperature in the range of from 130° C. to 140° C.

8. The cord of claim 1 wherein said yarn is composed of at least one twisted strand which is composed of filaments of reinforcing material.

9. The cord of claim 8 wherein said yarn is composed of said strand cabled together with other strands.

10. The cord of claim 8 wherein said strand has a denier in the range of from 800 to 1500.

11. The cord of claim 1 wherein a second substantially inextensible yarn of high tenacity is spirally wrapped around said core in opposed relation to said first yarn so that after said reduction in tenacity of said core and elongation of said cord said first and second yarns will twist together.

12. The cord of claim 1 wherein said yarn is wound around the core in the range of from 3 to 7 turns per centimeter and said cord is elongatable between 50 percent and 100 percent.

* * * * *

UNITED STATES PATENT OFFICE
CERTIFICATE OF CORRECTION

Patent No. 4,458,475          Dated July 10, 1984

Inventor(s) Georges J. E. Schmit and Thomas N. H. Welter

It is certified that error appears in the above-identified patent and that said Letters Patent are hereby corrected as shown below:

Column 1, line 62, "thread 10" should read --tread 10--.

Column 3, line 15, "core 20" should read --cord 20--;

line 26, "ns" should read --turns--.

Column 5, line 44, delete "b" after "at least".

Column 6, line 3, delete the period after "cord";

Signed and Sealed this

Fifth Day of February 1985

[SEAL]

Attest:

DONALD J. QUIGG

Attesting Officer      Acting Commissioner of Patents and Trademarks